US008209666B1

(12) United States Patent
Schaub et al.

(10) Patent No.: US 8,209,666 B1
(45) Date of Patent: Jun. 26, 2012

(54) SYSTEMS AND METHODS FOR TESTING INTERFACES AND APPLICATIONS

(75) Inventors: Matthew Hamilton Schaub, San Antonio, TX (US); Thirumurugan Thyagarajan, San Antonio, TX (US); Charla Myrlene Ingalls, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1100 days.

(21) Appl. No.: 11/870,339

(22) Filed: Oct. 10, 2007

(51) Int. Cl.
*G06F 9/44* (2006.01)

(52) U.S. Cl. ......... 717/125; 717/126; 717/129; 717/131

(58) Field of Classification Search .................. None
See application file for complete search history.

(56) References Cited

U.S. PATENT DOCUMENTS

| | | | |
|---|---|---|---|
| 6,260,065 B1 * | 7/2001 | Leiba et al. | 709/224 |
| 6,804,796 B2 * | 10/2004 | Gustavsson et al. | 714/38.1 |
| 6,907,546 B1 * | 6/2005 | Haswell et al. | 714/38.11 |
| 6,915,454 B1 * | 7/2005 | Moore et al. | 714/38.14 |
| 6,993,747 B1 * | 1/2006 | Friedman | 717/124 |
| 7,000,224 B1 * | 2/2006 | Osborne et al. | 717/125 |
| 7,299,451 B2 * | 11/2007 | Dygon et al. | 717/124 |
| 7,664,990 B2 * | 2/2010 | Kodaka et al. | 714/38.1 |
| 7,913,229 B2 * | 3/2011 | Squires et al. | 717/124 |
| 2002/0032673 A1 * | 3/2002 | Yen et al. | 707/2 |
| 2002/0184614 A1 * | 12/2002 | Davia et al. | 717/127 |
| 2003/0197727 A1 * | 10/2003 | Milius | 345/744 |
| 2004/0107415 A1 * | 6/2004 | Melamed et al. | 717/124 |
| 2004/0133881 A1 * | 7/2004 | Chamberlain et al. | 717/125 |
| 2005/0086643 A1 * | 4/2005 | Shane | 717/124 |
| 2006/0036483 A1 * | 2/2006 | Jang | 705/14 |
| 2006/0129992 A1 * | 6/2006 | Oberholtzer et al. | 717/124 |
| 2007/0266373 A1 * | 11/2007 | Liu | 717/126 |
| 2008/0120602 A1 * | 5/2008 | Comstock et al. | 717/125 |
| 2008/0163367 A1 * | 7/2008 | Lee et al. | 726/21 |
| 2008/0282230 A1 * | 11/2008 | Belvin et al. | 717/125 |
| 2009/0007078 A1 * | 1/2009 | Hoyek et al. | 717/131 |
| 2009/0037882 A1 * | 2/2009 | Allen et al. | 717/125 |
| 2010/0037210 A1 * | 2/2010 | Okada | 717/125 |
| 2011/0067093 A1 * | 3/2011 | Kamada et al. | 726/7 |

OTHER PUBLICATIONS

Jason I. Hong et. al. "WebQuilt: A Proxy-based Approach to Remote Web Usability Testing", University of California at Berkeley, pp. 263-285.*
Jason I. Hong et. al. "WebQuilt: A Proxy-based Approach to Remote Web Usability Testing", 2001, University of California at Berkeley, pp. 263-285.*
"Articles: Conducting Tests," *WebsiteAZ*, http://websiteaz.com/articles/conducting-tests.htm, downloaded 2007, 3 pages.
Caroll, Linda., "Test Your Web Site Design Plan in Advance," *The Conversion Chronicles*, http://www.conversionchronicles.com/Test_Your_Web_Site_Design_Plan_in_Advance.html, downloaded 2007, 2 pages.

(Continued)

*Primary Examiner* — Isaac Tecklu
(74) *Attorney, Agent, or Firm* — Brooks, Cameron & Huebsch, PLLC (57) ABSTRACT

A vendor system may enable a verification agent to verify a behavior of an interface before the interface may be provided to a customer. The vendor system may enable the verification agent to generate verification information. The verification information may be converted into a package of verification information that may be used to activate the interface. Results may be produced based on based on the behavior of the interface with the package of verification information. Additionally, each portion of the interface that may not produce an expected result may be displayed to the verification agent.

9 Claims, 11 Drawing Sheets

OTHER PUBLICATIONS

Harmelen et al., "WebMaster: Knowledge-based Verification of Web-Pages," *WebMaster*, http://www.aduna-software.org/home/papers/IEAAIE99.pdf, 1999, 10 pages.

Miller, Edward., "Website Testing," *eValid*, http://www.soft.com/eValid/Technology/White.Papers/website.testing.html, downloaded 2007, 12 pages.

* cited by examiner

SYSTEMS AND METHODS FOR TESTING INTERFACES AND APPLICATIONS

CROSS-REFERENCES TO RELATED APPLICATIONS

This application is related to subject matter disclosed in the following commonly assigned applications: U.S. patent application Ser. No. 11/870,321, filed on Oct. 10, 2007 and U.S. patent application Ser. No. 11/870,331, filed on Oct. 10, 2007. The disclosure of each application is incorporated by reference herein in its entirety.

BACKGROUND

Vendors such as financial institutions, insurance institutions, merchants, or the like may host an online website that may be used by customers or potential customers to engage in one or more actions such as viewing account information, making purchases, modifying account information, registering for services, registering for membership, or the like. Such an online website may provide a series of interfaces such as Web pages, software applications, or the like that may be provided to the consumer to input information corresponding to the actions the customer may select. For example, a potential customer may select the action of registering for membership with a financial institution. To register, the potential customer may access the online website and may be provided with a series of interfaces. The potential customer may input the appropriate information into the interfaces. The information may then be transmitted to the vendor where a determination using underlying rules and/or criteria of the interface may be made regarding whether or not the consumer may be eligible for membership. If the consumer may be eligible, a member number may be generated and an interface reflecting the new membership including his or her member number may be provided to the consumer. If the consumer may be ineligible, an interface reflecting the ineligibility may be provided to the consumer.

Before such interfaces may be provided to the consumer via the online website, the interfaces and underlying rules and criteria may undergo an analysis, or testing. For example, tests may be conducted to ensure that correct results may be generated and/or displayed based on information that may be input into the interface by the consumer. Additionally, tests may be conducted to ensure that the interfaces interact appropriately. For example, tests may be conducted to ensure that interfaces are linked appropriately amongst other interfaces. To engage in such an analysis, a tester typically enters each test case scenario or each possible input combination separately into a testing platform application. The tester may then compare the output generated by the testing platform application with the appropriate output to verify the interfaces and underlying rules and criteria are functioning and behaving appropriately. Unfortunately, requiring a tester to enter each scenario or possible input combination separately may be tedious, time consuming, and inefficient.

SUMMARY

In view of the above shortcomings and drawbacks, computer-readable storage media, methods, software applications, and computer systems for verifying an interface of a vendor are provided. For example, a vendor system operated by the vendor may enable a verification agent to generate verification information. The verification information may be converted into a package of verification information that may be used to activate the interface. In an example embodiment, the vendor system may produce verification results based on the behavior of the interface with the package of verification information. Additionally, each portion of the interfaces, applications, or the like that may not produce an expected result may be displayed to the verification agent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3-5 depict example application interfaces for establishing verification packages.

FIGS. 6-8 depict example displays for viewing verification results.

DETAILED DESCRIPTION

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
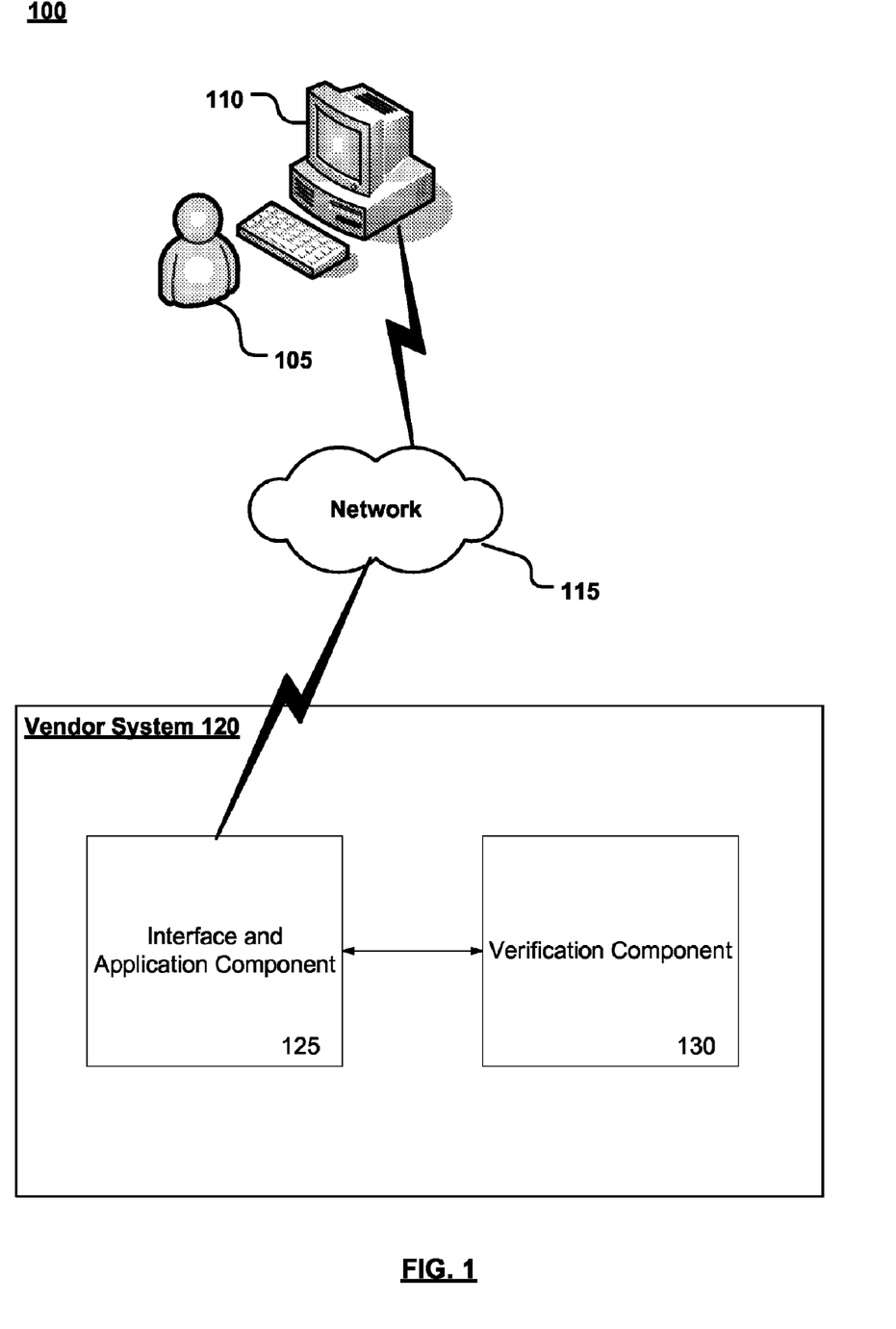
FIG. 1 depicts an example configuration of a vendor in communication with a user of an electronic device.

FIG. 1 depicts an example configuration 100 of a vendor system 120 in communication with a user 105. As shown in FIG. 1, the vendor system 120 may be in communication, via a network 115, with the user 105 via an electronic device 110. The vendor system 120 may be operated by a vendor such as a financial institution, an insurance institution, a merchant, or the like. For example, the vendor may include a bank, a credit union, an insurance company, a merchant, or the like that may provide interfaces to users via the vendor system 120. The user 105 may be a customer or potential customer of the vendor. Thus, in an example embodiment, the user 105 may be a member or prospective member of a bank, credit union, or the like.

The user 105 may communicate with the vendor system 120 that may be operated by the vendor using, for example, the electronic device 110. The electronic device 110 may include hardware components such as a processor, a graphics card, a storage component, a memory component, a memory card reader, an antenna, a communication port, a disc drive, or the like. The electronic device 110 may also include software components such as an operating system that may control the hardware components. The electronic device 110 may include any other suitable components such that the user 105 may interact with the vendor 120 via the network 115, which will be described in more detail below. According to example embodiments, the electronic device 110 may be a computer, a cellular telephone, a PDA, a server, or the like.

The electronic device 110 may be in communication with the vendor system 120 via a network 115 such that the user 105 may access one or more components of the vendor 120 system. The network 115 may be any local- or wide-area network, such as a corporate intranet or the Internet, for example. The vendor system 120 may include one or more components such as servers, processing apparatuses, computing devices, or the like implemented therein. For example, the vendor system 120 may include any combination of hardware components such as processors, databases, storage drives, registers, cache, RAM memory chips, data buses, or the like and/or software components such as operating systems, database management applications, or the like. In an example embodiment, the vendor system 120 may include a network-based server that may provide interfaces and applications to the user 105.

Additionally, the vendor system 120 may include any combination of systems and sub-systems implemented therein. For example, the vendor system 120 may include an interface and application component 125 and a verification component 130. The interface and application component 125 and the verification component 130 may be in operative communication with each other via, for example, a bus or any other subsystem that may transfer data between computer components such as the components implemented in the vendor system 120.

The interface and application component 125 may be a Web-based component such as a Web-based server that may present interfaces and applications to the user 105 via the electronic device 110. For example, the interface and host application component 125 may provide an interface such as a Web page that may be displayed to the user 105. The interface and application component 125 may also provide applications such as Web-based applications, software applications, or the like to the user 105.

The verification component 130 may include may include any combination of hardware components such as processors, databases, storage drives, registers, cache, RAM memory chips, data buses, or the like and/or software components such that the verification component 130 may provide a mechanism for verifying interfaces and/or applications before such interfaces and/or applications may be displayed or presented to the user 105 by the vendor system 120. For example, the verification component 130 may provide a testing mechanism for interfaces such as Web pages to verify such interfaces function properly and/or behave properly, which will be described in more detail below.

Figure 2:
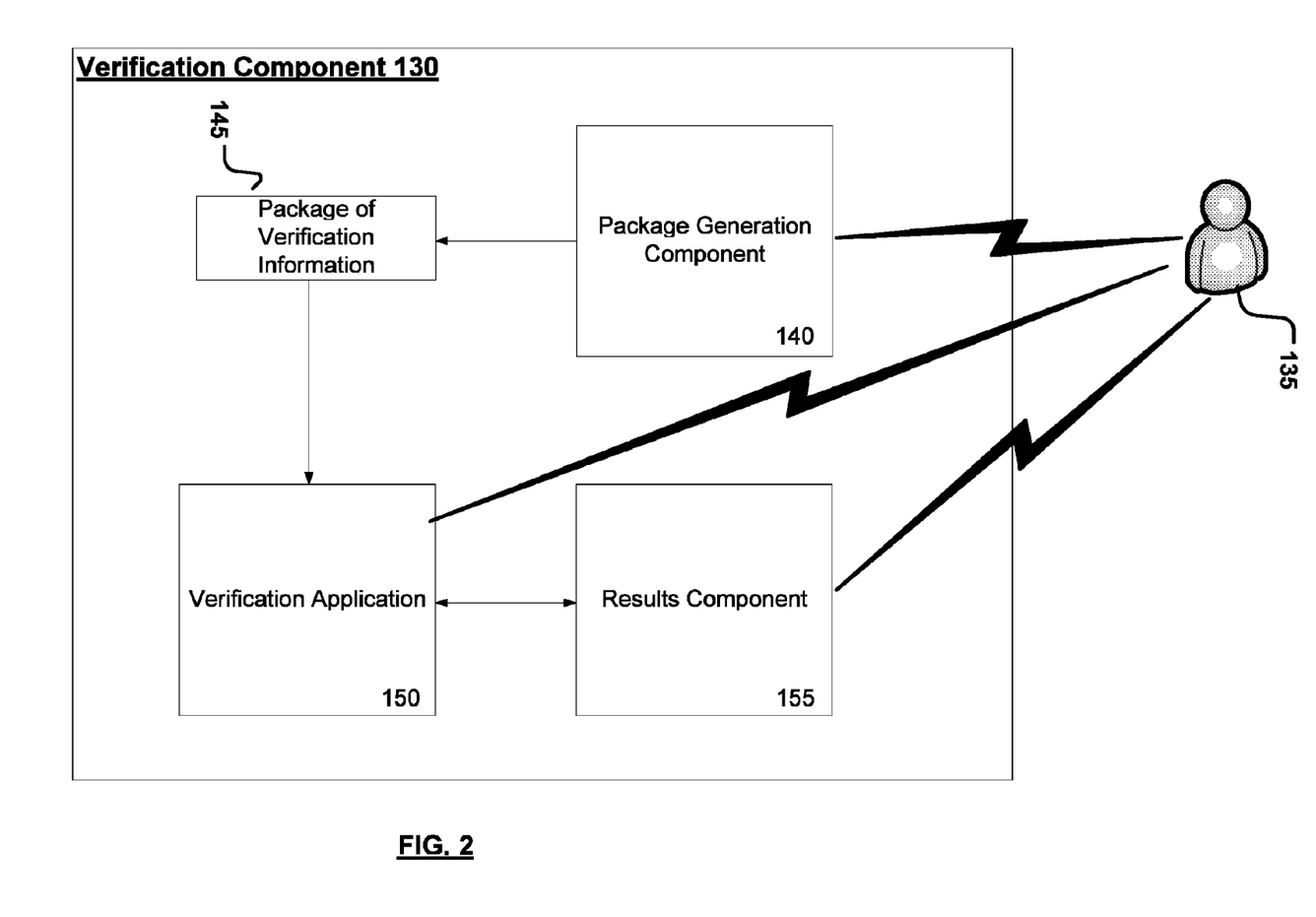
FIG. 2 depicts an example configuration of a verification component.

FIG. 2 depicts an example configuration of the verification component 130. As shown in FIG. 2, the verification component 130 may include a package generation component 140, a verification application 150, and a results component 155. The package generation component 140 may include any combination of hardware components such as processors, databases, storage drives, registers, cache, RAM memory chips, data buses, or the like and/or software components. According to an example embodiment, the package generation component 140 may include a collection application that may be implemented therein. The collection application may include, for example, a spreadsheet interface that may be used to input scenarios for each possible input of an interface that may be tested before being provided to a customer of the vendor. The collection application may also provide options that may be selected to format or convert information that may be entered therein.

In an example embodiment, the package generation component 140 may receive unprocessed or raw verification information such as scenarios or test cases for each input of an interface being verified by the verification component 130. In an example embodiment, the package generation component may receive unprocessed or raw verification information from a verification agent 135. The verification agent 135 may be an entity such as an individual that may test the functionality and/or the behavior of the interfaces and/or applications before such applications may be provided to the user 105, shown in FIG. 1. For example, the verification agent 135 may be a software engineer, a computer scientist, or the like.

Additionally, the package generation component 140 may format the unprocessed verification information into a package of verification information 145 that may be accepted by the verification application 150. For example, the package generation component 140 may convert the unprocessed verification into the package of verification information 145 such that each individual scenario may be combined into a single package and may be of a correct input format for the verification application 150.

The verification application 150 may receive the package of verification information 145. The verification application 150 may be an automated software verification or testing tool that may be used by the verification agent 135 to run packaged scenarios. The verification application may activate an interface such as a Web-based application, a Web page, associated Web pages, a collection of Web pages, or the like being tested by the verification component 130 using the package of verification information 145. For example, the verification application 150 may populate or enter each scenario in the package of verification information 145 into the appropriate inputs of the interface being tested. The verification application 150 may then execute each scenario to determine whether criteria such as rules or the like that may be used to produce an output of the interface may be functioning appropriately for each scenario. For example, a Web-based interface for registering new customers may be tested to determine whether the appropriate eligibility output may be given based on the scenarios in the package of data information 145. In one embodiment, the Web-based interface may produce a customer identifier for specific input scenario based on the criteria. The verification component 150 may test the accuracy of the criteria by comparing the expected results from the input scenario in the package of data information 145 with the actual results produced by the criteria based on the input scenario in the package of data information 145. If the expected and actual results match, the criteria may be functioning correctly for that particular scenario.

Additionally, the verification application 150 may execute each scenario to determine whether the interface functions correctly. For example, the verification application may execute each scenario to determine whether or not the appropriate display of the interface may be generated or if links to additional displays of the interface may be functioning correctly based on the scenario in the package of verification information 145.

In an example embodiment, the verification application 150 may produce verification results based on the behavior of the interface with the package of verification information 145. The verification results may be rendered by the verification application 150 and may be provided to the results component 155. The results component 155 may include any combination of hardware components such as processors, databases, storage drives, registers, cache, RAM memory chips, data buses, or the like and/or software components. In one embodiment, the results component 155 may store portions of the interface that may not be functioning appropriately. For example, the results component 155 may store a specific display or screen shot that may not be functioning properly within the interface. The results component 155 may generate messages such as e-mail, instant messages, text messages, or the like that may include results information for the verification agent 135. According to one embodiment, the verification agent 135 may also interact with the results component 155 to view the displays or screen shots that may have failed to function correctly and may view results information for each scenario in the package of verification information 145, which will be described in more detail below.

Figure 3:
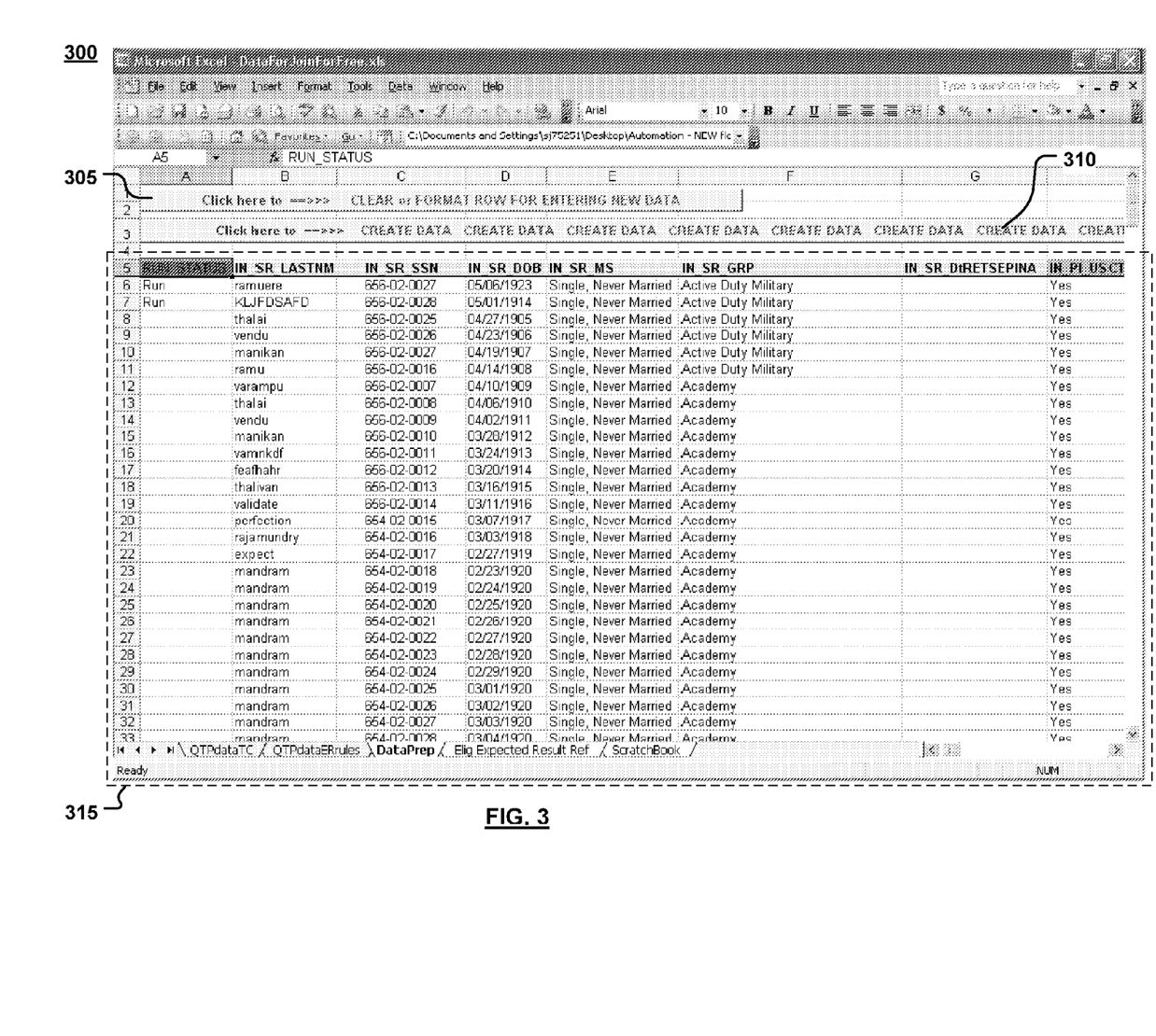

FIGS. 3-5 depict example interfaces for establishing verification packages. As described above, the example interfaces may be provided to a verification agent 135 via the package generation component 140, for example. Additionally, the example interfaces may be Web pages generated using, for example, HTML, Java, or the like or user interfaces for applications such as collection applications. As shown in FIG. 3, the package generation component 140 may provide an application interface 300 to the verification agent 135. For example, the verification agent 135 may interact with the package generation component 140 to activate or launch an application such as a collection application that may be implemented therein, as described above.

Upon such interaction, the application interface 300 may be provided to the verification agent 135 such that the verification agent 135 may interact with the application interface to provide verification information such as scenarios for each possible input combination of an interface such as a Web application, Web pages, associated Web pages, or the like being tested. In an example embodiment, the application interface 300 may include a format button 305, a create package button 310, and an information collection block 315.

The information collection block 315 may include verification information such as unprocessed or raw test data corresponding to each input scenario of an interface being tested. Upon entering the verification information into the information collection block 315, the verification agent 135 may select the create package button 310. The create package button 310 may covert the verification information into a package of verification information. The package of verification information may include each scenario packaged into a single collection of data such as a file, for example. In an example embodiment, upon selection of the create package button 310, the verification application 150, described above in FIG. 2, may also be activated or launched such that the verification application 150 may receive the package of verification information, may activate the interface being tested by populating the inputs of the interface being tested with the appropriate information for each scenario in the package, and may produce results that may be provided to the results component 155, described above in FIG. 2.

To initiate entering new unprocessed verification information, the verification agent 135 may select the format button 305. Upon selection of the format button 305, the information collection block 315 may be cleared. The verification agent may interact with an application interface 400 to add new verification information.

As shown in FIG. 4, the verification agent 135 may input a separate test case in each row by selecting from a selection block such as selection block 405. According to one embodiment, for each interface being verified, a set of predefined options may be linked to each field of the application interfaces 300 and 400. For example, for verifying an interface such as a Web-based registration application, the inputs of the Web-based registration application such as rank, employment status, date of birth, or the like may include predefined options such as predefined formats, predefined limitations, predefined ranges, or the like. These predefined options may be linked to the interfaces 300 and 400 such that when the verification agent 135 creates new verification information the verification information may be formatted to match the actual inputs of the Web-based registration application. Thus, in an example embodiment, the verification agent 135 may select from predefined options using the selection block 405, for example, to generate verification information.

As shown in FIG. 5, the verification agent 135 may also interact with an application interface 500 to provide expected results for various input scenarios of an interface being tested. For example, upon entering verification information using the application interfaces 300 and 400, the verification agent 135 may be directed to the application interface 500 to enter expected results for each of the test case scenarios in an expected result input block 505. The expected results entered into the expected result input block 505 may then be compared with actual results, which will be described in more detail below.

Figure 6:
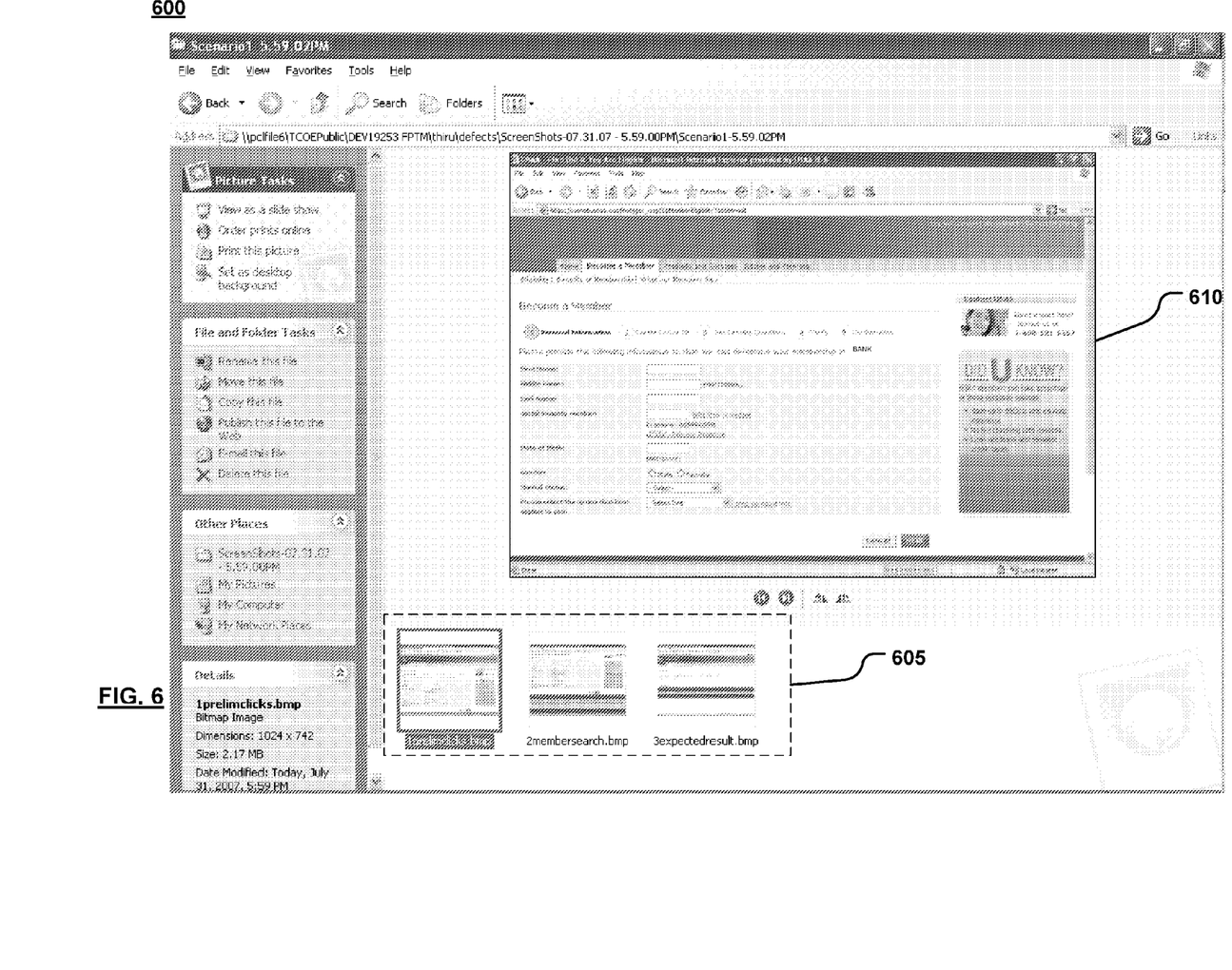
Figure 7:
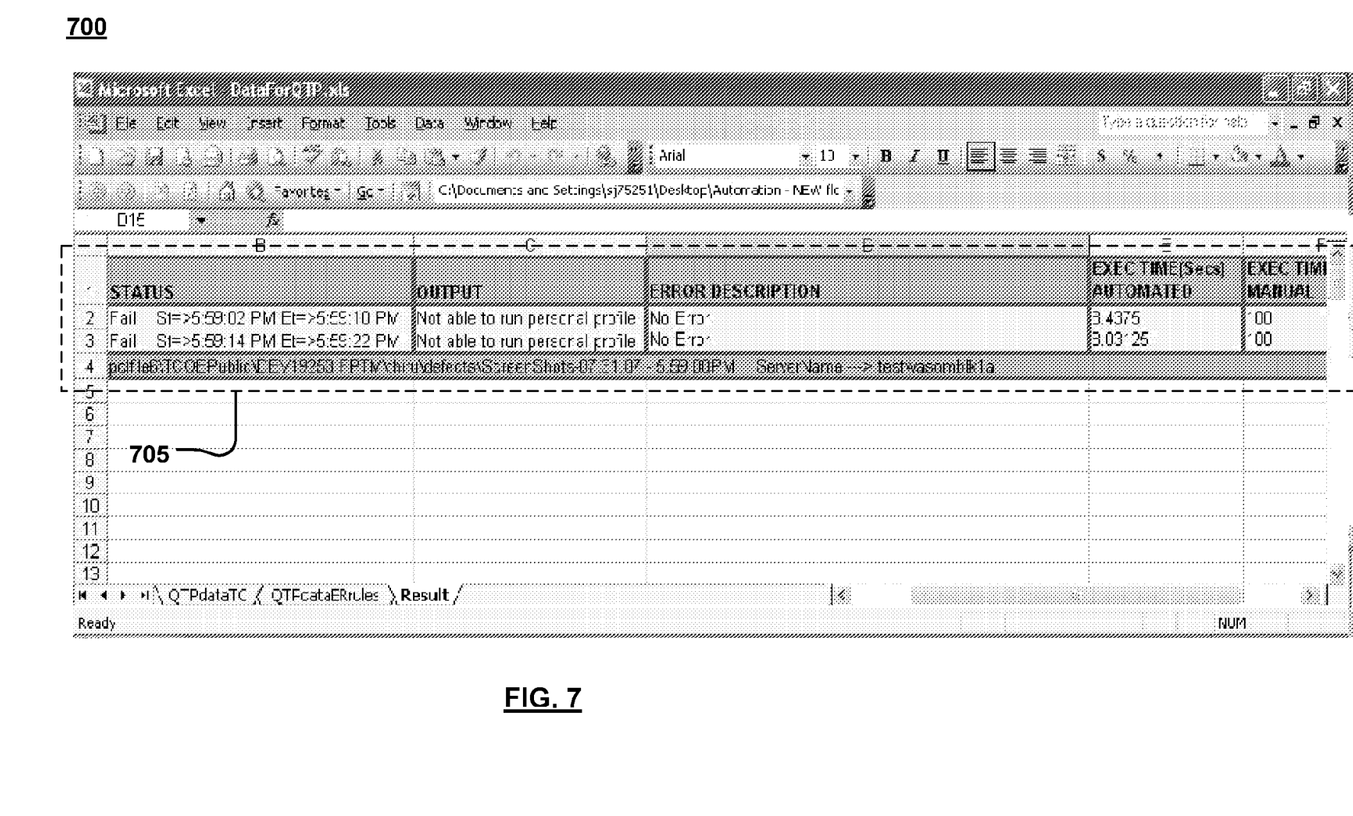

FIGS. 6-8 depict example displays for viewing verification results. Upon completion of a verification session by the verification application 150, shown in FIG. 2, using a package of verification information such as the package of verification 135, shown in FIG. 2, the verification agent 135 may interact with the results component 155, shown in FIG. 2, to view a display 600, a display 700, and a display 800. As shown in FIG. 6, the display 600 may illustrate each portion of an interface being tested that may fail or may produce results that may not correspond to expected results or may not produce expected behavior, for example. The verification agent 135 may interact with the display 600 by selection each portion in a portion block 605. By selecting a portion in the portion block 605, the verification agent 135 may view the particular portion in a portion display block 610.

The verification agent 135 may also be provided with the display 700, shown in FIG. 7, via the results component 155, shown in FIG. 2, for example. As shown in FIG. 7, the display 700 may illustrate information such as data related to the results of the verification to the verification agent 135. For example, the display 700 may include a result block 705. The results block 705 may include information on the status such as failure or success of each scenario in the package, execution time of each scenario in the package, the actual output of each scenario in the package, and, if an error or failure may have occurred, an error description of each scenario in the package.

According to an example embodiment, the display 800 may be automatically generated and provided to the verification agent 135. For example, as shown in FIG. 8, the display 800 may include a message 805 that may be generated with the results being embedded in a body portion 810. The message 805 may be an e-mail, instant message, text message, or the like that may be automatically generated upon completion of a verification of an interface with the package of verification information and transmitted to the verification agent.

In an example embodiment, the verification agent 135 may repair the portion of the interface producing unexpected results based on the interaction with the displays 600, 700, and/or 800.

Figure 9:
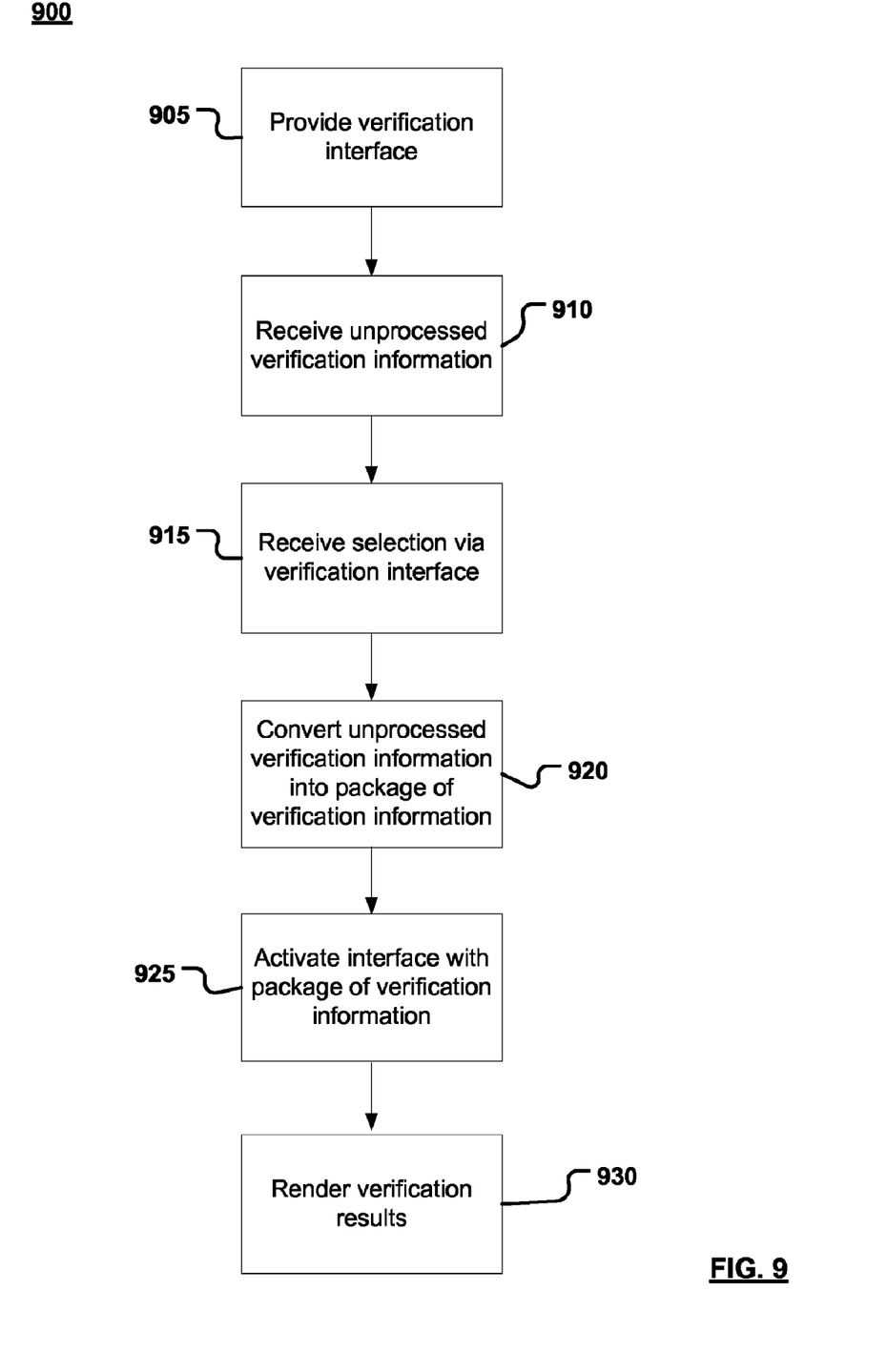
FIG. 9 depicts an example method of verifying an interface.

FIG. 9 depicts an example method 900 of verifying an interface. According to one embodiment, the example method 900 may represent actions taken by one or more of the components of the systems or applications described above in FIGS. 1-8. As shown in FIG. 9, at 905, a vendor system may provide a verification interface to a verification agent. The vendor system may include one or more components such as servers, processing apparatuses, computing devices, or the like that may be operated by a vendor such as a financial institution, an insurance institution, or the like. According to one embodiment, the vendor system may be a network-based server that may provide interfaces and applications to a customer or potential customer of the vendor.

In an example embodiment, the vendor system may include an interface and application component and a verification component. The verification component may be used to verify or test an interface such as a Web-based application, Web pages, associated Web pages, or the like before the interface may be provided to a customer or potential customer of the vendor via the interface and application component. To verify the interface, the vendor system may provide a verification interface to a verification agent via the verification component. The verification agent may be may be an entity such as an individual that may test the functionality and/or the behavior of the interfaces and/or applications before such applications may be provided to the customer. For example, the verification agent may be a software engineer, computer scientist, or the like.

At 910, the vendor system may receive unprocessed verification information from the verification agent. For example, the verification component may include a package generation component. The package generation component may include a collection application. The verification agent may interact with the package generation component including the collection application to enter an input scenario for each possible input combination for the interface being tested.

At 915, the vendor system may receive a selection from the verification agent via the verification interface. For example, the package generation component may include a processing option such as a create package button that may be selected by the verification agent.

Upon selection of the processing option, at 915, the vendor system may covert the unprocessed verification information into a package of verification information, at 920. For example, the package generation component may combine each input scenario for each possible input combination for the interface being tested into a single package of the appropriate format for processing.

At 925, the vendor system may activate the interface being tested with the package of information. For example, the verification component may include a verification application. The verification application may populate or enter each scenario in the package of verification information into the appropriate inputs of the interface being tested. The verification application may then execute each scenario to determine whether criteria such as rules, or the like that may be used to produce an output of the interface may be functioning appropriate for each scenario. For example, a Web-based interface for registering new customers may be tested to determine whether the appropriate eligibility output may be given based on the scenarios in the package of data information. In one embodiment, the Web-based interface may produce a customer identifier for specific input scenario based on the criteria. The verification component may test the accuracy of the criteria by comparing the expected results form the input scenario in the package of data information with the actual results produced by the criteria based on the input scenario in the package of data information. If the expected and actual results match, the criteria may be functioning correctly for that particular scenario.

Additionally, the verification application may execute each scenario to determine whether the interface functions correctly. For example, the verification application may execute each scenario to determine whether the appropriate display of the interface may be generated or links to additional displays of the interface may be functioning correctly based on the scenario in the package of verification information.

At 930, the vendor system may render verification results based on a behavior of the interface with the package of data verification. For example, the verification application verification results that may provide evidence of whether a particular scenario in the package failed, passed, reasons behind failures, execution times, or the like. The verification application may also produce the portion of the interface such as the particular display that may have failed in the verification results. In an example embodiment, the results may be provided to the verification agent for review.

Figure 10:
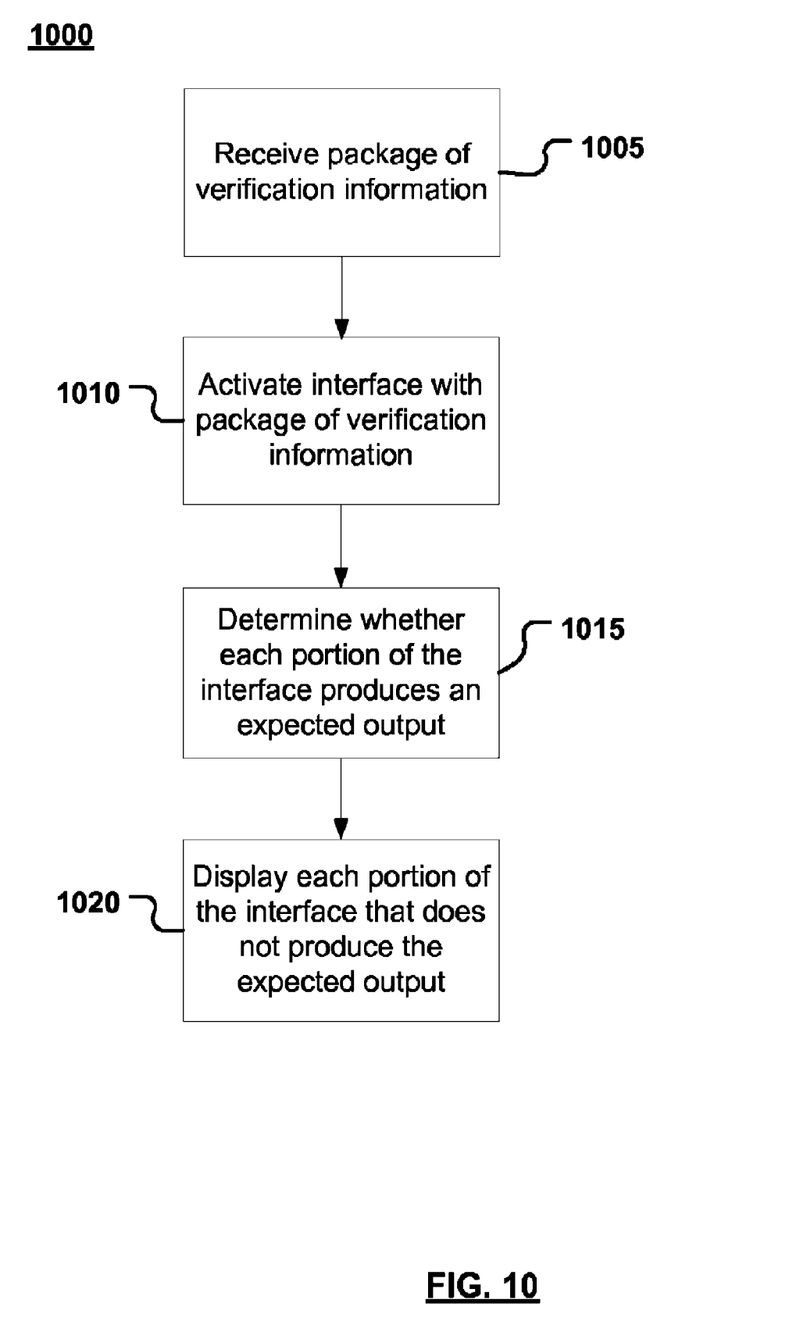
FIG. 10 depicts an example method of providing verification results to a verification agent.

FIG. 10 depicts an example method 1000 of providing verification results to a verification agent. According to one embodiment, the example method 1000 may represent actions taken by one or more of the components of the systems and applications described above in FIGS. 1-8. As shown in FIG. 10, at 1005, a vendor system may receive a package of verification information. The vendor system may include one or more components such as servers, processing apparatuses, computing devices, or the like that may be operated by a vendor such as a financial institution, an insurance institution, or the like. According to one embodiment, the vendor system may be a network-based server that may provide interfaces and applications to a customer or potential customer of the vendor.

In an example embodiment, the vendor system may include an interface and application component and a verification component. The verification component may be used to verify or test an interface such as a Web-based application, Web pages, associated Web pages, or the like before the interface may be provided to a customer or potential customer of the vendor via the interface and application component. To verify the interface, a package of verification information may be received by the verification component of the vendor system, for example. The package generation component may combine each input scenario of each possible input combination for the interface being tested into a single package of the appropriate format for processing.

At 1010, the vendor system may activate an interface being tested with the package of verification information. For example, the verification component may include a verification application. The verification application may populate or enter each scenario in the package of verification information into the appropriate inputs of the interface being tested.

At 1015, the vendor system may determine if each portion of the interface being tested produces expected results. The verification application may execute each scenario to determine if each portion of the interface may be functioning appropriately for each scenario being tested.

In an example embodiment, the verification application may execute each scenario to determine if each criteria, such as each rules or the like that may be used to produce an output of the interface may be functioning appropriately for each scenario. For example, a Web-based interface for registering new customers may be tested to determine if the appropriate eligibility output may be given based on the scenarios in the package of data information. In one embodiment, the Web-based interface may produce a customer identifier for specific input scenario based on the criteria. The verification component may test the accuracy of the criteria by comparing the expected results form the input scenario in the package of data information with the actual results produced by the criteria based on the input scenario in the package of data information. If the expected and actual results match, the criteria may be functioning correctly for that particular scenario.

Additionally, the verification application may execute each scenario to determine if the interface functions correctly. For example, the verification application may execute each scenario to determine if the appropriate display of the interface may be generated or links to additional displays of the interface may be functioning correctly based on the scenario in the package of verification information.

At 1020, the vendor system may display each portion of the interface that may not produce the expected results. For example, the verification application may produce each display of the interface or each criteria that may be functioning correctly or that may not behave properly. Each of the portions that may not produce the expected results may be displayed to a verification agent such as a software engineer, computer scientist, or the like that may repair the portion of the interface that may not be producing the expected results based on such displays.

Figure 11:
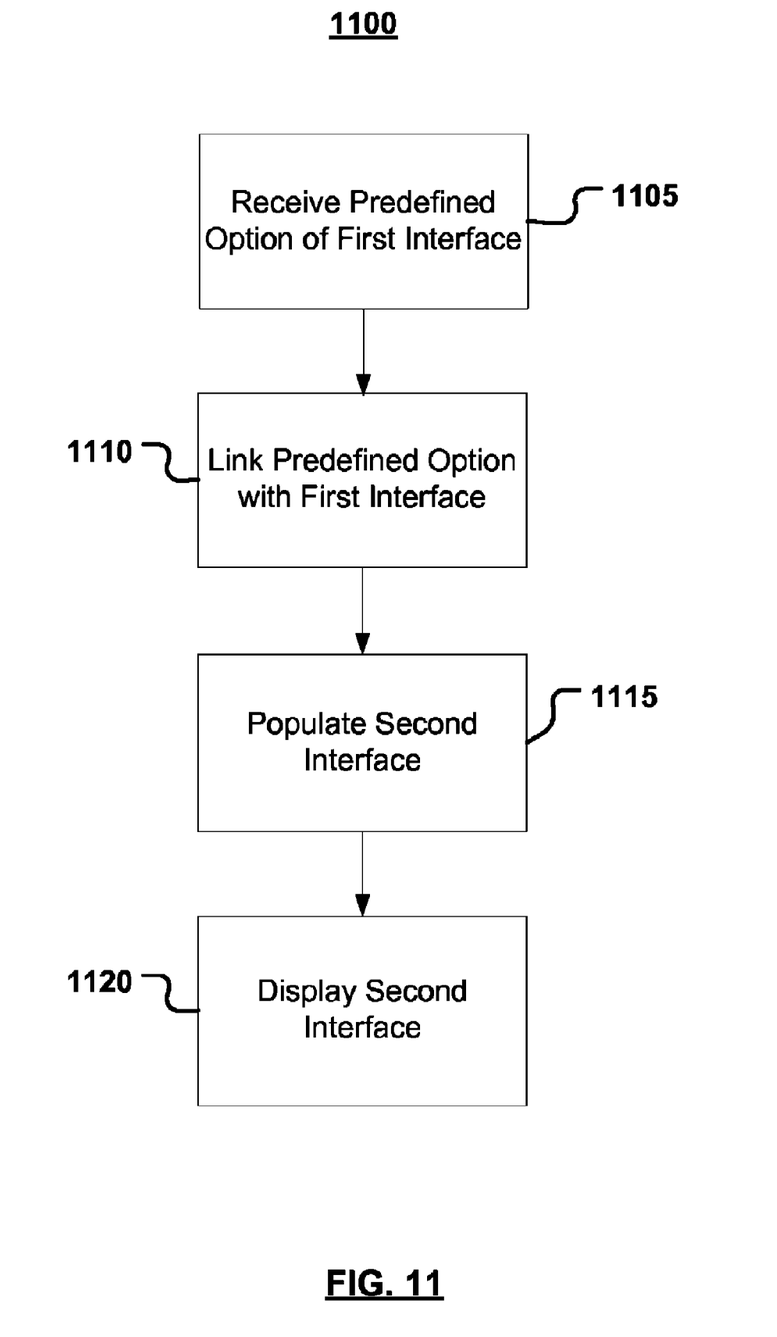
FIG. 11 depicts an example method of producing verification information.

FIG. 11 depicts an example method 1100 of producing verification information. According to one embodiment, the example method 1100 may represent actions taken by one or more of the components of the systems and applications described above in FIGS. 1-9. As shown in FIG. 11, at 1105, a vendor system may receive a predefined option of a first interface being verified. The vendor system may include one or more components such as servers, processing apparatuses, computing devices, or the like that may be operated by a vendor such as a financial institution, an insurance institution, or the like. According to one embodiment, the vendor system may be a network-based server that may provide interfaces and applications to a customer or potential customer of the vendor.

In an example embodiment, the vendor system may include an interface and application component and a verification component. The verification component may be used to verify or test an interface such as a Web-based application, Web pages, associated Web pages, or the like before the interface may be provided to a customer or potential customer of the vendor via the interface and application component.

The verification component may include a package generation component. The package generation component may receive a predefined option such as predefined formats, predefined inputs, predefined ranges, or the like that may be associated with an input of a first interface being verified by the vendor system At 1110, the vendor system may link the predefined option with the first interface. For example, the package generation component may establish a relationship between the predefined option and the first interface such that the relationship may tie the predefined option to a specific portion of the interface.

At 1115, the vendor system may populate a second interface with the predefined option. For example, the second interface may include a collection interface in the package generation component. The package generation component may populate a field or a characteristic in the collection interface with the predefined option such that the verification information that may be entered may correspond to the predefined option.

At 1120, the vendor system may display the second interface to a verification agent. For example, the package generation component may display the collection interface to the verification agent such that the verification agent may enter verification information for the first interface being verified.

Thus, in an example embodiment, the second interface may ensure that the verification information may correspond to the inputs available on the first interface.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high-level procedural or object-oriented programming language to communicate with a computer system. However, the program(s) can be implemented in assembly or machine language, if desired. In any case, the language may be a compiled or interpreted language and may be combined with hardware implementations.

The described methods and apparatus may also be embodied in the form of program code transmitted over some transmission medium, such as over electrical wiring or cabling, through fiber optics, or via any other form of transmission, wherein when the program code may be received and loaded into and executed by a machine, such as an EPROM, a gate array, a programmable logic device (PLD), a client computer, a video recorder, or the like, the machine becomes an apparatus for practicing the invention. When implemented on a general-purpose processor, the program code combines with the processor to provide a unique apparatus that operates to perform the processing of the disclosed embodiments.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for producing unprocessed verification information, the method comprising:

receiving a predefined option for each input of a first interface being verified before presentation of the first interface to a user;

linking the predefined option to each input of the first interface being verified;

populating a second interface with the predefined option and a processing option;

displaying the second interface to a verification agent, wherein the verification agent selects from the predefined options to create the verification information such that the verification information is formatted to match each input of the first interface being verified;

receiving a selection of the processing option via the second interface;

converting the unprocessed verification information into a package of verification information;

activating the first interface with the package of verification information; and rendering verification results based on a behavior of the first interface with the package of verification information.

2. The method of claim 1, wherein the first interface comprises at least one of the following: a Web page, associated Web pages, and a Web-based application.

3. The method of claim 1, wherein the second interface comprises a collection application.

4. A system for producing unprocessed verification information, the system comprising:
   a processor;
   a memory communicatively coupled to the processor;
   instructions stored in the memory and executable by the processor to:
      receive a predefined option for each input of a first interface being verified before presentation of the first interface to a user;
      link the predefined option to each input of the first interface being verified;
      populate a second interface with the predefined option and a processing option;
      display the second interface to a verification agent, wherein the verification agent selects from the predefined options to create the verification information such that the verification information is formatted to match each input of the first interface being verified;
      receive a selection of the processing option via the second interface;
      convert the unprocessed verification information into a package of verification information;
      activate the first interface with the package of verification information; and
      render verification results based on a behavior of the first interface with the package of verification information.

5. The system of claim 4, wherein the first interface comprises at least one of the following: a Web page, associated Web pages, and a Web-based application.

6. The system of claim 4, wherein the second interface comprises a collection application.

7. A computer-readable storage medium having computer-readable instructions for producing unprocessed verification information, the computer-readable instructions comprising instructions for:
   receiving a predefined option for each input of a first interface being verified before presentation of the first interface to a user;
   linking the predefined option to each input of the first interface being verified;
   populating a second interface with the predefined option and a processing option;
   displaying the second interface to a verification agent, wherein the verification agent selects from the predefined options to create the verification information such that the verification information is formatted to match each input of the first interface being verified;
   receiving a selection of the processing option via the second interface;
   converting the unprocessed verification information into a package of verification information;
   activating the first interface with the package of verification information; and
   rendering verification results based on a behavior of the first interface with the package of verification information.

8. The computer-readable storage medium of claim 7, wherein the first interface comprises at least one of the following: a Web page, associated Web pages, and a Web-based application.

9. The computer-readable storage medium of claim 7, wherein the second interface comprises a collection application.

* * * * *